Feb. 25, 1941.    H. S. POLIN ET AL    2,233,297
REMOTE INDICATING SYSTEM
Filed Aug. 14, 1935    3 Sheets-Sheet 3
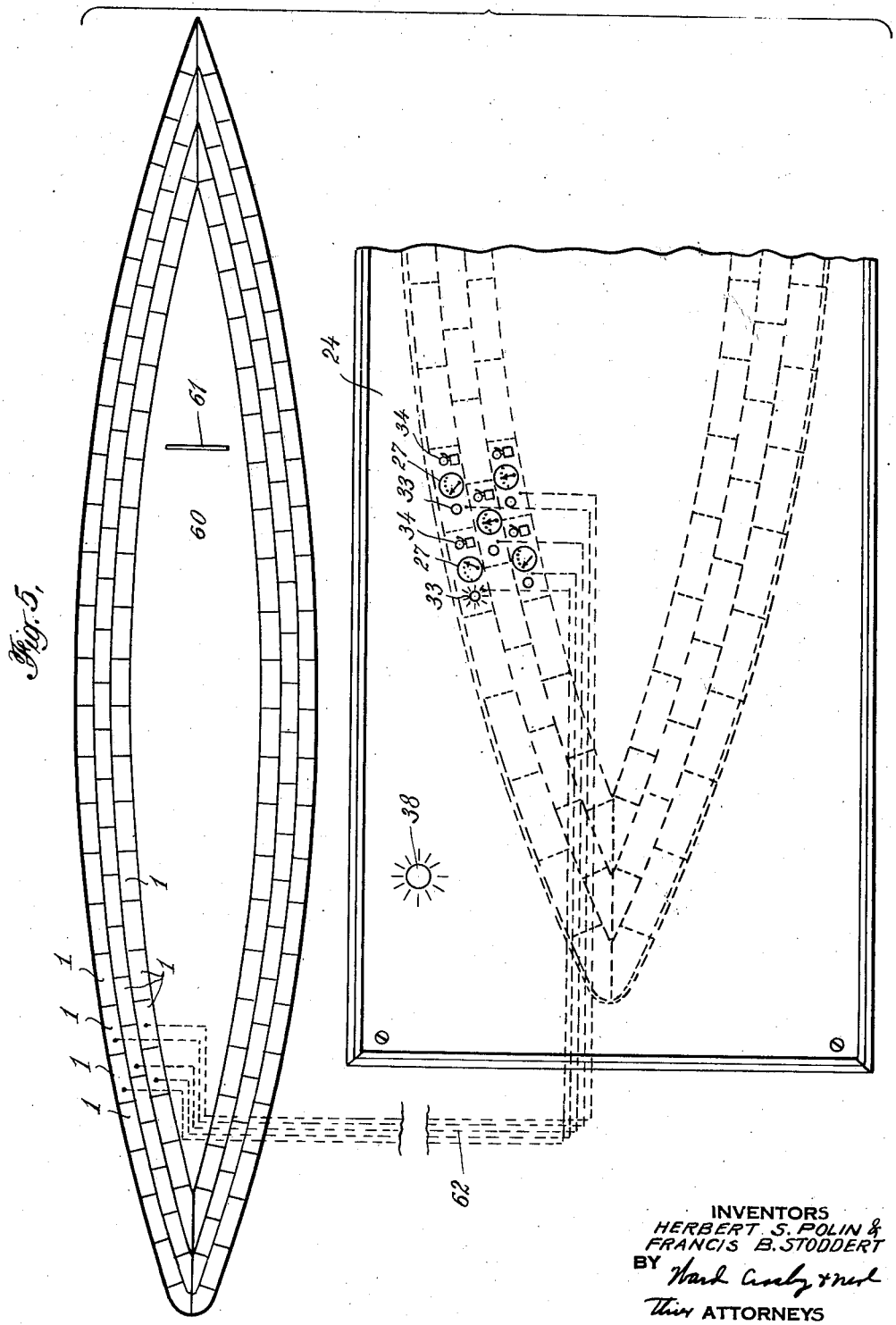
INVENTORS
HERBERT S. POLIN &
FRANCIS B. STODDERT
BY
ATTORNEYS Patented Feb. 25, 1941

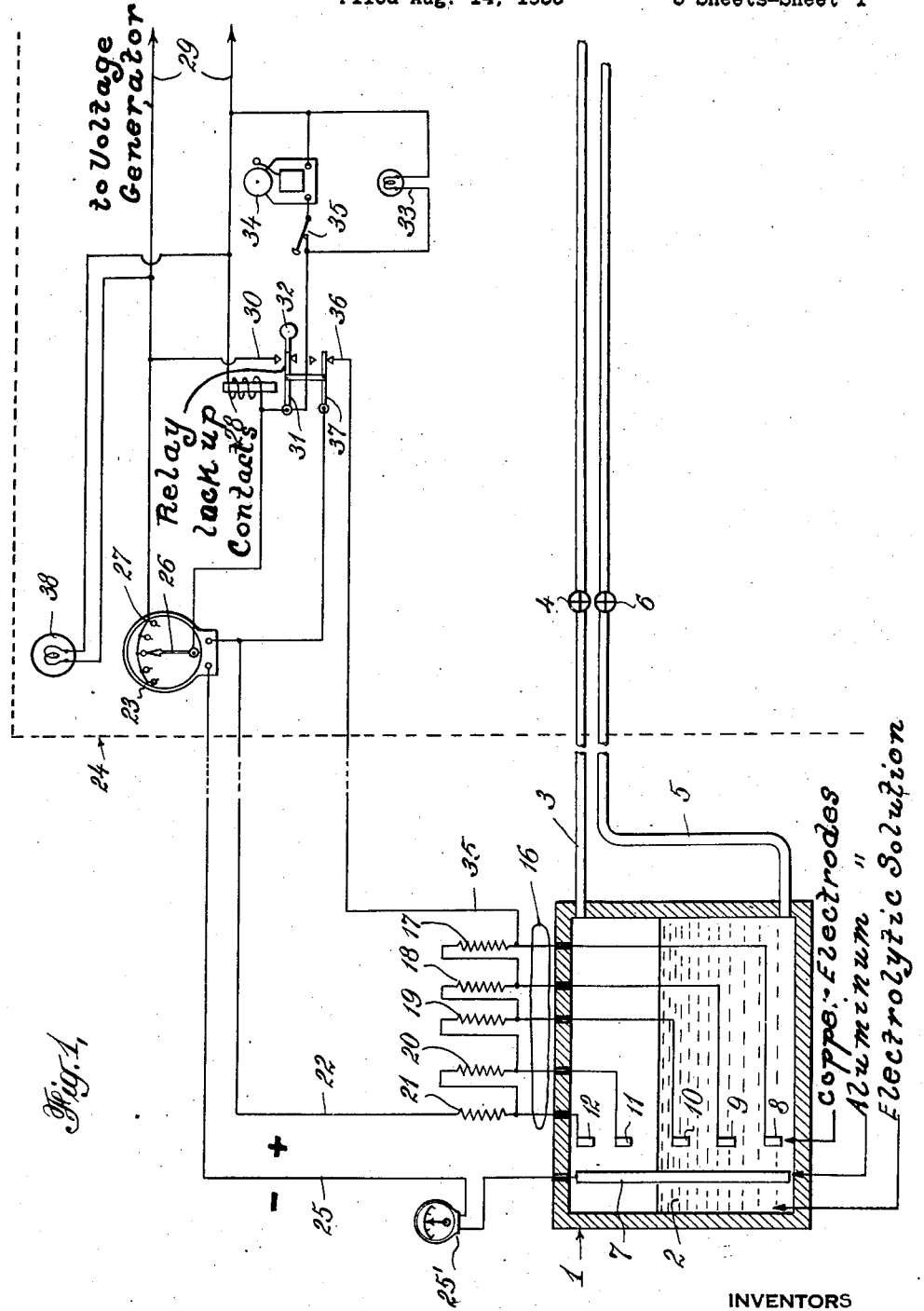

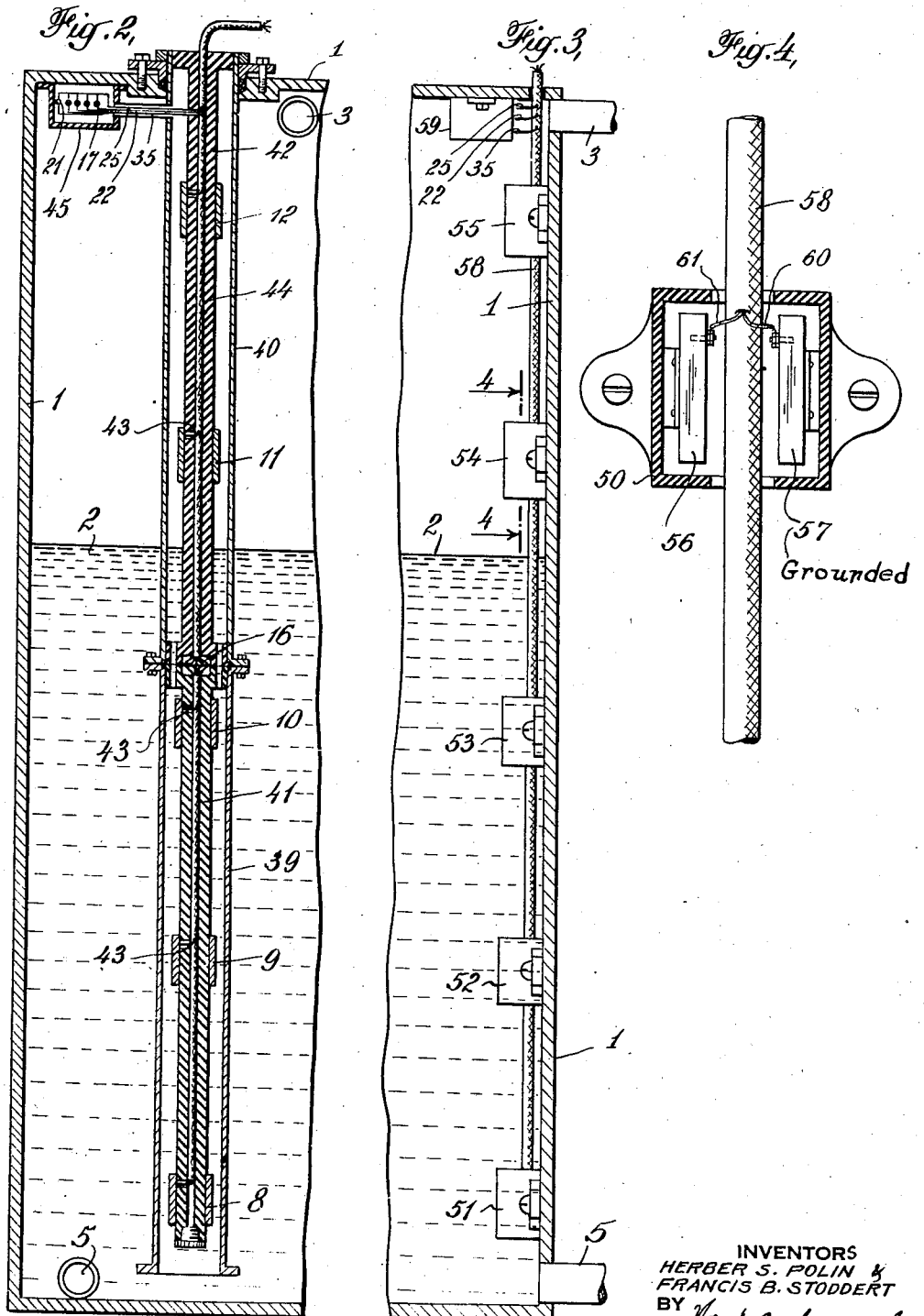

2,233,297

UNITED STATES PATENT OFFICE 2,233,297

REMOTE INDICATING SYSTEM

Herbert S. Polin, Sands Point, Long Island, and Francis B. Stoddert, New York, N. Y., assignors to Harry A. Furman, Schenectady, N. Y.

Application August 14, 1935, Serial No. 36,128

8 Claims. (Cl. 73—304)

This invention relates to electrical indicating devices and more particularly to apparatus for remotely indicating the condition and sea water content of water tight bulkheads or compartments on ships.

In certain types of naval vessels, especially war vessels of modern construction, steel compartments or tanks are uniformly disposed about the interior of the hull below the water line. Pipe lines connect to the individual compartments for purposes of filling them with sea water and for thereafter draining them. These tanks are commonly designated in naval parlance as damage control compartments.

When the ship is in proper trim prior to a naval engagement the tanks are arranged as to content in variable relation from compartment to compartment, being either empty or containing sea water in accordance with a pattern determined by the damage control officer.

If, during an engagement, one or more of these compartments is ripped open by a shell and flooded with sea water, the ship tends to list in the direction of the hit. The damage control officer upon determining which compartments have been destroyed, floods by means of the pipe lines, undamaged compartments so allocated as to compensate the list.

It is essential that the damage control officer be provided with means for speedily checking the condition of each compartment in order to locate those damaged during an engagement, or more generally to check the system. It is also desirable that this information be made available at some central point, as on one or more conveniently located panel boards provided with suitable means for remotely indicating the status of each compartment.

Alternatively, in the case of non-combatant vessels, it is desirable to have an indication of water leakage due to a parting of a seam, a break in a water main, etc.

The present invention provides an electrically actuated remote indicating system of the character and for the purpose above stated, having as an outstanding feature of novelty the fact that it does not rely on the artificially generated power of the ship for operation, but to the contrary is automatically self-energized by naturally occurring energy transformations resulting from contact of the sea water with electrodes of the indicating apparatus.

The invention is based on the well understood principle that when a pair of electrodes, which are electro-potentially dissimilar, for example, composed respectively of dissimilar metals such as an aluminum or silver electrode paired with a copper electrode, or other electrodic material, as carbon, cadmium or the like, are immersed in an electrically conducting solution or electrolyte, such as sea water, a potential difference will be established between them of a magnitude dependent on the particular electrodes selected. The arrangement thus constitutes an electrolytic cell generating a voltage which may be employed to actuate a suitable indicating device such as a meter connected between the electrodes.

According to one aspect of the invention, each damage control compartment has disposed therein a pair of electrodes. At strategic locations about the ship, control panels are provided, each of which is equipped with a plurality of indicating elements, for example milliammeters, corresponding in number to the number of damage control compartments. A meter is allocated to each damage control compartment, and is connected over conductors to the electrodes disposed therein.

So long as a given damage control compartment is empty no voltage will be generated between the electrodes, and the associated meter at the control panels will show zero registration. On the other hand, when the compartment contains sea water, the voltage generated between the now immersed electrodes will establish a current flow through the associated meter at the control panel to deflect the needle thereof.

Inasmuch as individual damage control compartments may be quite large, having a depth of thirty feet or more in certain instances, it is desirable that the control panel meters indicate not merely whether a given compartment is empty or contains sea water, but as to the latter, the extent to which the compartment is filled at any given instant, as well as its rate of filling. Such indications may be secured, in accordance with the invention, by extending one of the electrodes, for example, the negative electrode, from top to bottom of the tank. The electrode of opposite sign—in this case the positive electrode—is broken up into sections disposed at successive elevations of the tank, with resistors bridged between these sections.

With this arrangement, sea water flowing into the tank will first immerse only the lowest sector of the positive electrode together with a portion of the continuous or negative electrode. The voltage thus generated must force current through all of the resistors in series in flowing through the control panel meter thus deflecting its needle to a relatively slight extent. As the water rises to immerse the next higher positive electrode sector, the meter current is increased primarily by reason of the fact that the portion supplied thereto by the additional voltage thus generated does not traverse the resistor connected to the lowest positive electrode sector. Similarly as the water rises to successively higher positive electrode sectors, the meter current increases progressively because for each successive immersion thereof an additional resistor is removed from the circuit traversed by the meter current. The deflection of the control panel meter thus indicates the extent of filling of the associated compartment at any given instant, while the rate of deflection of the needle apprises the operator as to the rate of filling.

An important aspect of the invention is the determination that certain combinations of electrode materials resist polarization to a markedly greater degree than do others. Polarization may be broadly defined as any inter-electrodic action (such as gas formation and oxide deposition at either or both of the electrodes due to electro-chemical exchange between the electrolyte and the electrode) tending to degenerate the cell's E. M. F. A resistance interposed in the current withdrawal circuit, if above a critical value, inhibits polarization. Thus is postulated a relationship between the electrodic materials and the value of the limiting resistor which may be low for electrodes highly resistant to polarization and correspondingly higher for electrodes of lesser resistance.

According to a feature of the invention, the meters may be arranged on the panel board in conformity with the physical layout of the associated damage control compartments in the ship's hull. The operator thus has before him at all times a diagrammatic or pictorial representation by means of which he may instantaneously envisage the condition of the entire ship as to the ballasting action of the damage control compartments.

According to a further feature of the invention, there is identified with each meter on the control panel, an alarm circuit comprising a lamp and optionally also a bell. Initial deflection of a meter due to entry of sea water into the associated damage control compartment actuates the alarm circuit permanently to light the lamp and ring the bell until the alarm circuit is manually reset by the operator. The manual reset feature assures that the change in status of the compartment will not pass unnoticed by the observer.

In the drawings:

Fig. 1 illustrates in part schematically and in part as a circuit diagram, the invention as applied to a single damage control compartment for indicating the amount of sea water in the compartment as well as its rate of filling;

Fig. 2 shows in longitudinal section the construction for the electrodes of a damage control compartment wherein the electrode of one type of metal is in the form of a continuous tubular shell within which are mounted at intervals a plurality of electrodes of a different type of metal. The outer shell is of a height corresponding to the depth of the compartment, the inner electrodes being spaced according to the elevations at which successive indications are desired as to the depth of flooding of the compartment;

Figs. 3 and 4 show a modified electrode construction wherein each damage control compartment is provided at successive elevations with a plurality of pairs of positive and negative electrodes, mounted in the compartment as illustrated in Fig. 3 in elevation, with each pair of electrodes enclosed in a housing as illustrated in Fig. 4.

Fig. 5 illustrates schematically the manner in which the indicating devices for the individual control compartments are arranged on a control panel, in conformity with the actual layout of the associated damage control compartments within the hull of the ship.

Referring to Fig. 1, a damage control compartment 1, illustrated schematically in sectional elevation, is shown partially filled with sea water 2. Normally the filling of the tank is under control of a supply line 3 penetrating the compartment near its top, and extending through a check valve 4 to a sea water pressure main (not shown). Similarly, the emptying of the tank is controlled by a drain pipe 5 penetrating the compartment near its base and extending through a check valve 6 to a suction main (not shown).

Disposed within the compartment is an electrode 7 of one type of metal, such as aluminum, extending from near the top to near the bottom of the compartment. Spaced somewhat from electrode 7 are a plurality of electrodes 8 to 12 inclusive, composed of a different type of metal, such as copper, from that of electrode 7. Electrodes 8 to 12 inclusive are disposed respectively at increasing elevations such as near the bottom, at elevations of one-fourth, one-half, and three-quarters, and also near the top of the compartment.

Electrodes 8 to 12 inclusive are wired by means of conductors 16 individual thereto to a point external to compartment 1 where series connected resistors 17 to 21 inclusive are bridged in succession between the successive electrodes 8 and 12 inclusive, with the uppermost electrode 12 connected through the last resistor 21 of the series and over a conductor 22 to one terminal of a suitable indicating device, such as an ammeter 23, mounted on a control panel 24 located at some convenient point of the ship, such as at the central control or on the bridge. The opposite terminal of meter 23 is connected over a conductor 25 and through a meter 25' (located adjacent compartment 1) to electrode 7.

Meter 23 is provided with a deflectable indicator 26 which, at its point of maximum deflection completes a circuit through a contact 27 to operate a relay 28 with electrical energy supplied from the ship's generators over conductors 29. Momentary energization of relay 28 in this manner, completes a circuit from the power supply line 29 and through the back contact 30 and armature 31 of the relay, whereby the relay locks itself in the operated condition until released by manual depression of knob 32 affixed to the armature. Closure of contact 30 serves additionally to connect a signal lamp 33 and an alarm bell 34 across the supply line 29. The bell 34 may be rendered inoperative if desired by opening of a switch 35 in series therewith.

In order to assure that the signal lamp 33 and alarm bell 34 will be actuated to attract the observer's attention to meter 23 as soon as sea water begins to flow into the damage control compartment 1, the lowermost electrode 8 is wired over a conductor 35, through a normally closed back contact 36 and armature 37 of relay 28, and through meter 23 and thence back over conductor 25 to electrode 7. As soon, therefore, as the sea water is of sufficient depth to immerse the lowermost electrode 8, the voltage thus produced between electrodes 7, 8 causes sufficient current to flow through meter 23 to deflect needle 26 against contact 27 thereby completing the circuit to energize and lock up relay 28, and in turn to operate the alarm circuit.

Relay 28 upon operating and locking up, opens the circuit traced over conductor 35 at the back contact 37 of the relay, whereupon the current now supplied to meter 23 over conductors 22, 25 from electrodes 7, 8, is forced to traverse all of the resistors 17 to 21 in series. The meter current is thus reduced to such a low value that the needle 26 swings back substantially to zero, under the eye of the observer whose attention should by this time have been attracted to the meter by operation of the alarm.

When the sea water has risen to the height immersing electrode 9, the resulting voltage generated between electrodes 7, 9 will increase the meter current in that the current path therefrom to the meter excludes the resistor 17 connected to electrode 8. Similarly, as the water rises successively to electrodes 10, 11 and 12 the meter current will increase progressively due primarily to exclusion of resistors 18, 19 and 20 from the current path to the meter. A single lamp 38 of characteristic identifying color or construction may be provided on the control board 24 to indicate continuously whether or not power is being supplied over leads 29. To this end lamp 38 is bridged directly across the line as shown.

The electrodes 7 to 12 inclusive shown schematically in Fig. 1 may be physically embodied as illustrated in Fig. 2, wherein the continuous electrode 7 takes the form of one or a number of metal tubular sections 39, 40 terminating in radial flanges for joining by bolts or otherwise as shown. Members 41, 42 of insulating material, such as Bakelite, are disposed within and supported by members 39, 40. The electrodes 8 to 12 inclusive in the form of metal sleeves surround and are secured to the metal insulating supports at intervals corresponding to the required elevation in the damage control compartment 1. Each of the electrodes 8 to 12 inclusive is connected as shown at 43 to a conductor 16 housed in a cable 44 occupying a central bore in members 41, 42. The upper end of the electrode structure terminates in a chamber 45 housing the resistors 17 to 21 inclusive, as shown.

In the construction of Figs. 3 and 4, the conductor 7 of Fig. 1 is broken up into sections corresponding to electrodes 8 to 12 inclusive. The resulting positive and negative electrodes are noused in pairs in casings 51 to 55 inclusive, mounted successively at desired elevations within the damage control compartment 1. The casings are provided with removable cover plates, that of Fig. 4 being removed. The positive and negative electrodes 56 and 57 are mounted on opposite sides of a cable 58 extending upward through each of the casings, and thence through the top of the damage control compartment 1 to a casing 59 housing the resistors 17 to 21 inclusive of Fig. 1. The negative electrodes are grounded to the damage control compartment, a ground lead 60 extending from each housing to conductor 25, within the cable. The positive electrodes are wired to the resistors 17 to 21, over separate cable leads such as 61.

Inasmuch as in the embodiments of Figs. 2 to 4 inclusive, the electrode or electrodes of one polarity, are grounded to the damage control compartment 1, it will be understood that the compartment 1 may itself comprise the electrode of one polarity, such as that corresponding to electrode 7 in Fig. 1.

Referring to Fig. 5, the hull of a ship is indicated in plan view at 60, with the damage control compartments 1 disposed about the interior of the hull, as shown. The control panel 24 which may be mounted on the bridge as indicated at 61, is illustrated in partial view greatly enlarged in comparison with the ship's hull 60 in order to illustrate the manner in which the meters 27 and their associated signal lamps 33 and alarms 34 are mounted on the panel. As shown, the meters are arranged on the panel to present a diagrammatic representation of the physical layout within the ship's hull of the associated damage control compartments individually connected thereto over conductors 62. In consequence of this arrangement the damage control officer can envisage at a glance the status of all compartments.

With the remote indicating system of the present invention, no "live" wires extend from the ship's generators to the damage control compartment. So long as the compartments are empty the wires extending therefrom to the control points are wholly "dead" and even when the compartments are filled the resulting current flow in this construction is extremely minute and the voltage generated by the electrolytic cell action wholly negligible as regards fire hazard due to possible short circuits.

Failure of the ship's generators affects only the alarm circuits on the control panels, the meters being operable independently thereof to indicate the status of the damage control compartments even though the generators have failed. This feature is of extreme importance during a naval engagement.

What we claim is:

1. Apparatus for indicating the quantity of an electrolytic solution in a compartment comprising: a plurality of electrodes disposed at successive elevations in said compartment, a resistance, means individually connecting said electrodes to successive points of said resistance, an electrode which is electropotentially dissimilar to said plurality, and exposed thereto at said successive elevations, a current meter connected from said electrode to the topmost electrode of said plurality, a lock-up relay having front and back contacts, a connection from said meter through back contacts of said lock-up relay to the lowermost electrode of said plurality, a source of electrical power, signaling means energizable therefrom through front contacts of said relay, and means including the said connection to said lowermost electrode for actuating said relay in response to momentary maximum deflection of said meter on immersion of the lowermost electrode of said plurality in said electrolyte.

2. Apparatus for indicating the depth of an electrolytic solution in a compartment which comprises a plurality of electrodes disposed at different elevations in said compartment, a plurality of current impeding means connected between adjacent pairs of said electrodes which are successively short-circuited as the solution rises into contact with more than one electrode, electrodic means which is electropotentially dissimilar to said plurality of electrodes and exposed thereto at successive elevations, and current responsive means connected between said electrodic means and said plurality of electrodes and said current impeding means for indicating the progressive immersion of said electrodes.

3. Apparatus for indicating the depth of an electrolytic solution in a compartment which comprises a plurality of electrodes disposed at different elevations in said compartment, resistors connected between successive electrodes of said plurality which are successively short-circuited as the solution rises into contact with more than one electrode, electrodic means which is electropotentially dissimilar to said plurality of electrodes and exposed thereto at successive elevations, and current responsive means connected to said electrodic means and said plurality of electrodes and current impeding means for indicating the progressive immersion of said electrodes.

4. Apparatus for indicating the depth of an electrolytic solution in a compartment, which comprises a series of electrodes disposed at different elevations in said compartment, a co-operating electropotentially dissimilar electrode opposite each of said first named electrodes, resistors bridged between successive electrodes of one polarity which are successively short-circuited as the solution rises into contact with more than one electrode, and an electrical indicator the response of which varies with the magnitude of current therein, connected between the topmost electrode joined to a resistor and the electrode of opposite polarity, thereby to provide an indication which varies with progressive immersion of said electrodes.

5. Apparatus for indicating the depth of an electrolytic solution in a compartment, which comprises a series of electrodes disposed at different elevations in said compartment, a co-operating electropotentially dissimilar electrode opposite each of said first named electrodes, resistors bridged between successive electrodes of one polarity which are successively short-circuited as the solution rises into contact with more than one electrode, an electrical indicator the response of which varies with the magnitude of current therein, connected between the topmost electrode joined to a resistor and the electrode of opposite polarity whereby the response of said indicator varies with progressive immersion of said electrodes, a source of electrical power, a signal operable therefrom, and means for actuating said signaling means from said power source on immersion of the lowermost electrode joined to a resistor.

6. Apparatus for indicating the depth of an electrolytic solution in a compartment, which comprises a series of electrodes disposed at different elevations in said compartment, a co-operating electropotentially dissimilar electrode opposite each of said first named electrodes, resistors bridged between successive electrodes of one polarity which are successively short-circuited as the solution rises into contact with more than one electrode, an electrical indicator the response of which varies with the magnitude of the current therein, connected between the topmost electrode joined to a resistor and the electrodes of opposite polarity, a source of electrical power, signaling means responsive thereto, means including said indicator, a relay, and a connection therefrom to the lowermost electrode joined to a resistor for energizing said signaling means from said power source and for thereafter breaking said connection in response to momentary maximum response in said indicator on immersion of said electrode, whereby said indicator thereafter provides a response which varies with progressive immersion of said electrodes.

7. Apparatus for indicating the depth of an electrolytic solution in a compartment, which comprises a series of electrodes disposed at different elevations in said compartment, a co-operating electropotentially dissimilar electrode opposite each of said first named electrodes, resistors bridged between successive electrodes of one polarity which are successively short-circuited as the solution rises into contact with more than one electrode, an electrical indicator the response of which varies with the magnitude of the current therein, connected between the topmost electrode joined to a resistor and the electrodes of opposite polarity, a lock-up relay, a source of electrical power, signaling means energizable therefrom through contacts of said relay, said indicator and a connection therefrom to the lowermost electrode joined to a resistor for actuating said relay and thereby said signaling means and for breaking said connection in response to momentary maximum response of said indicator on immersion of said electrode whereby said indicator thereafter provides a response which varies with progressive immersion of said electrodes.

8. Apparatus for indicating the depth of an electrolytic solution in a compartment, which comprises a series of electrodes disposed at successive elevations in said compartment, a co-operating electropotentially dissimilar electrode opposite each of said first named electrodes, resistance means bridged across successive electrodes of one polarity whereby progressively decreasing resistance is interposed as the solution rises into contact with successive electrodes, and an electric indicator the response of which varies with the magnitude of the current therein, connected between the topmost electrode joined to said means and the electrodes of opposite polarity, thereby to provide an indication which varies with the progressive immersion of said electrodes.

HERBERT S. POLIN.
FRANCIS B. STODDERT.